(12) United States Patent
Choi

(10) Patent No.: US 6,932,380 B2
(45) Date of Patent: Aug. 23, 2005

(54) OVERHEAD AIRBAG HAVING AN EXTERNAL SIDE CUSHION PANEL

(75) Inventor: ChangSoo Choi, Rochester, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/677,611

(22) Filed: Oct. 1, 2003

(65) Prior Publication Data
US 2005/0073135 A1 Apr. 7, 2005

(51) Int. Cl.$^7$ ................................................ B60R 21/22
(52) U.S. Cl. .................................................... 280/730.1
(58) Field of Search .......................... 280/730.1, 728.2, 280/731, 732, 743.2

(56) References Cited

U.S. PATENT DOCUMENTS

| | | | |
|---|---|---|---|
| 3,784,225 A | 1/1974 | Fleck et al. | |
| 3,788,663 A | 1/1974 | Weman | |
| 3,843,150 A | 10/1974 | Harada et al. | |
| 3,929,350 A | 12/1975 | Pech | |
| 3,960,386 A | 6/1976 | Wallsten | |
| 3,970,328 A | 7/1976 | Wallsten | |
| 4,076,277 A | 2/1978 | Kuwakado et al. | |
| 5,427,410 A | 6/1995 | Shiota et al. | |
| 5,542,695 A | 8/1996 | Hanson | |
| 6,086,095 A | 7/2000 | Keshavaraj | |
| 6,102,435 A | 8/2000 | Wallner et al. | |
| 6,152,481 A | 11/2000 | Webber et al. | |
| 6,179,323 B1 | 1/2001 | Shellabarger | |
| 6,237,943 B1 | 5/2001 | Brown et al. | |
| 6,264,234 B1 | 7/2001 | Hill et al. | |
| 6,305,707 B1 | 10/2001 | Ishiyama et al. | |
| 6,315,324 B1 * | 11/2001 | Keshavaraj | 280/743.2 |
| 6,336,651 B1 | 1/2002 | Mramor et al. | |
| 6,454,298 B1 | 9/2002 | Hardig et al. | |
| 6,572,144 B2 * | 6/2003 | Igawa | 280/743.1 |
| 2002/0024200 A1 | 2/2002 | Eckert et al. | |

FOREIGN PATENT DOCUMENTS

| | | |
|---|---|---|
| GB | 2331491 | 5/1999 |
| GB | 2362139 | 11/2001 |

* cited by examiner

Primary Examiner—Faye M. Fleming
(74) Attorney, Agent, or Firm—Sally J. Brown

(57) ABSTRACT

An overhead airbag that may be used to protect and restrain the movement of a vehicle occupant is disclosed. The overhead airbag includes a cushion portion having a front panel, a first side panel, and a second side panel. A throat is also added to the cushion portion. The throat is positioned above the cushion portion. A patch is also added to airbag. The patch is attached to the cushion portion and is constructed such that when the airbag is in the inflated configuration, the airbag retains a depression between the cushion portion and the throat. More specifically, the patch is constructed such that when the airbag is in the inflated configuration, the airbag retains a depression between the front panel and the throat. A second patch that is attached to the throat and the second side panel may also be added.

34 Claims, 4 Drawing Sheets

OVERHEAD AIRBAG HAVING AN EXTERNAL SIDE CUSHION PANEL

BACKGROUND OF THE INVENTION

1. Field of the Invention

The present invention relates to passenger airbags. More specifically, the present invention relates to an overhead passenger with a patch that may be installed on or proximate to the vehicle's roof.

2. Description of Related Art

Inflatable safety restraints or airbags enjoy widespread acceptance as passive passenger restraints for use in motor vehicles. Airbags have built a reputation of preventing numerous deaths and injuries over the years of development, testing, and use. Studies show that in some instances, the use of frontally placed vehicular airbags can reduce the number of fatalities in head-on collisions by 25% among drivers using seat belts and by more than 30% among unbelted drivers. Other statistics suggest that in a frontal collision, the combination of a seat belt and an airbag can reduce the incidence of serious chest injuries by 65% and the incidence of serious head injuries by up to 75%. These numbers and the thousands of prevented injuries they represent demonstrate the life saving potential of airbags and the need to encourage their use, production, and development.

In part as a result of the benefits such as those described above, automakers are now required to install airbags in most new vehicles manufactured for sale in the United States. Many automobile manufacturers have turned this airbag technology requirement into a marketing tool. Enticed by the promise of added safety, vehicle purchasers frequently seek out vehicles with sophisticated airbag systems.

Airbags are generally linked to a control system within the vehicle that triggers their initiation when a collision occurs. This control system is often referred to as an electronic control unit (herein referred to as an "ECU"). The ECU includes a sensor that continuously monitors the acceleration and deceleration of the vehicle. This information is sent to a processor which processes it using an algorithm to determine if a deceleration experienced by the vehicle is a collision or not. If this accelerometer measures an abnormal deceleration, such as one caused by a collision event, it triggers the ignition of an airbag inflator.

When the processor of the ECU determines, based on a set of pre-determined criteria, that the vehicle is experiencing a collision, the ECU transmits an electrical current to an initiator assembly. The initiator assembly is in turn connected to an inflator that is coupled to the airbag module. The initiator activates the inflator. An inflator is a gas generator that typically uses a compressed or liquefied gas or mixture of gases, a solid fuel, or some combination of the two, to rapidly generate a large volume of inflation gas. This inflation gas is then channeled into the airbag. The gas inflates the airbag, allowing it to absorb the impact of the vehicle occupants and thus protecting them from impact against the steering column, the windshield, the instrument panel, and/or other portions of the vehicle interior.

Airbags may be positioned in a variety of locations throughout the vehicle. Airbags located within the steering wheel aid in preventing the driver from striking the steering wheel and the windshield in the event of an accident. Airbags have also been placed in the dashboard directly in front of the passenger seat in a vehicle. More recently, inflatable curtain airbags have been installed on the side portions of the vehicle in order to prevent the occupants from striking the doors and windows in the vehicle when an accident throws the occupant in that direction. Airbags have also been placed in seat belts, creating what has been termed inflatable seat belts. Knee bags and pelvic airbags have also been created to prevent an occupant's lower body from striking the vehicle.

One type of airbag that has received attention is recent years is an "overhead airbag" (sometimes referred to as an "overhead passenger airbag"). These overhead airbags are generally designed to protect an occupant seated in the vehicle's passenger seat. Such overhead airbags are generally positioned on or proximate to the vehicle's roof and are designed to descend and inflate in front of the passenger to prevent the passenger from harmfully impacting the dashboard, the windshield, the instrument panel, and/or other frontal portions of the vehicle during a crash.

As experience with the manufacturer and use of overhead airbags has progressed, the engineering challenges in their design, construction, and use have become better understood. Specifically, most overhead airbags systems are currently made such that that as the airbag is being inflated, the airbag is subjected to large amounts of tension and/or force that push the airbag towards the passenger seat. Unfortunately however, this large amount of tension increases the likelihood that the airbag will be deformed and/or deployed into a shape that fails to provide optimal restraint and impact protection to the occupant's head and upper torso during a crash.

Additionally, some currently known overhead airbags have a further disadvantage in that they form relatively hard and rigid structures when they are inflated and deployed. Such a rigid structure is disadvantageous because it increases the likelihood that the vehicle occupant will deflect or slide off the airbag during a front angular collision. If this sliding occurs, the airbag's ability to protect the occupant by preventing the occupant from harmfully impacting the vehicle interior will be greatly reduced.

Accordingly, there is a need in the art for a novel overhead airbag that addresses and/or solves one or more of the above-listed problems. Such a device is disclosed herein.

SUMMARY OF THE INVENTION

The apparatus of the present invention has been developed in response to the present state of the art, and in particular, in response to the problems and needs in the art that have not yet been fully solved by currently available overhead airbags. Thus, the present invention provides a novel overhead airbag that may be positioned onto a vehicle interior proximate to the vehicle's roof. The airbag is designed such that in the event of an accident or crash, an inflator will inflate and deploy the airbag into a position that prevents the vehicle occupant from harmful impact with a portion of the vehicle interior.

The overhead airbag includes a cushion portion. More than one cushion portion may also be used. The cushion portion is designed such that when the airbag is inflated, the cushion portion will restrain the movement of the vehicle occupant and prevent the vehicle occupant from harmfully impacting the windshield, the dashboard, the glove box and/or another portion of the vehicle interior.

In some embodiments, the cushion portion includes a front panel that is attached to first side panel. A second side panel that is positioned opposite the first side panel is also attached to the front panel. Preferably, the front panel is attached to the first and second side panels via sewing. However, methods such welding, gluing, adhesive bonding, and the like may also be used to attach the front panel to the first side panel and/or the second side panel.

A throat is also added to the overhead airbag. The throat is positioned above the cushion portion and is in fluid communication with the cushion portion. Preferably, the throat is designed such that when the overhead airbag is inflated, a volume of the inflation gas produced and/or supplied by the inflator will gain access into the cushion portion by passing or flowing through the throat.

The overhead airbag may additionally include a mounting area that is attached to the throat. The mounting area is a portion or section of the airbag that may be used to affix or attach the airbag to the roof and/or other sections of the vehicle interior. Preferably, the mounting area is in fluid communication with the inflator such that when the airbag is inflated, the inflation gas enters the airbag by passing through the mounting area.

The overhead airbag of the present invention further comprises side cushion panel (herein referred to as a "patch") that is attached to the cushion portion. More than one patch may also be used. Preferably, the patch is constructed such that when the airbag is inflated, the patch causes the airbag to retain a depression between the cushion portion and the throat. More specifically, the patch is constructed such that when the airbag is inflated, the patch causes the airbag to retain a depression between the front panel and the throat.

In some embodiments, the airbag is constructed such that a patch is attached to the first side panel and a second patch is attached to the second side panel. In other embodiments, the airbag may be constructed such that one or more of the patches contact the mounting area. In additional embodiments one or more of the patches wrap around the throat and contact the first side panel and/or the second side panel. In yet further embodiments, the airbag may be constructed such that one or more of the patches are integral with the first side panel and/or the second side panel.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of presently preferred embodiments of the invention.

Figure 1:
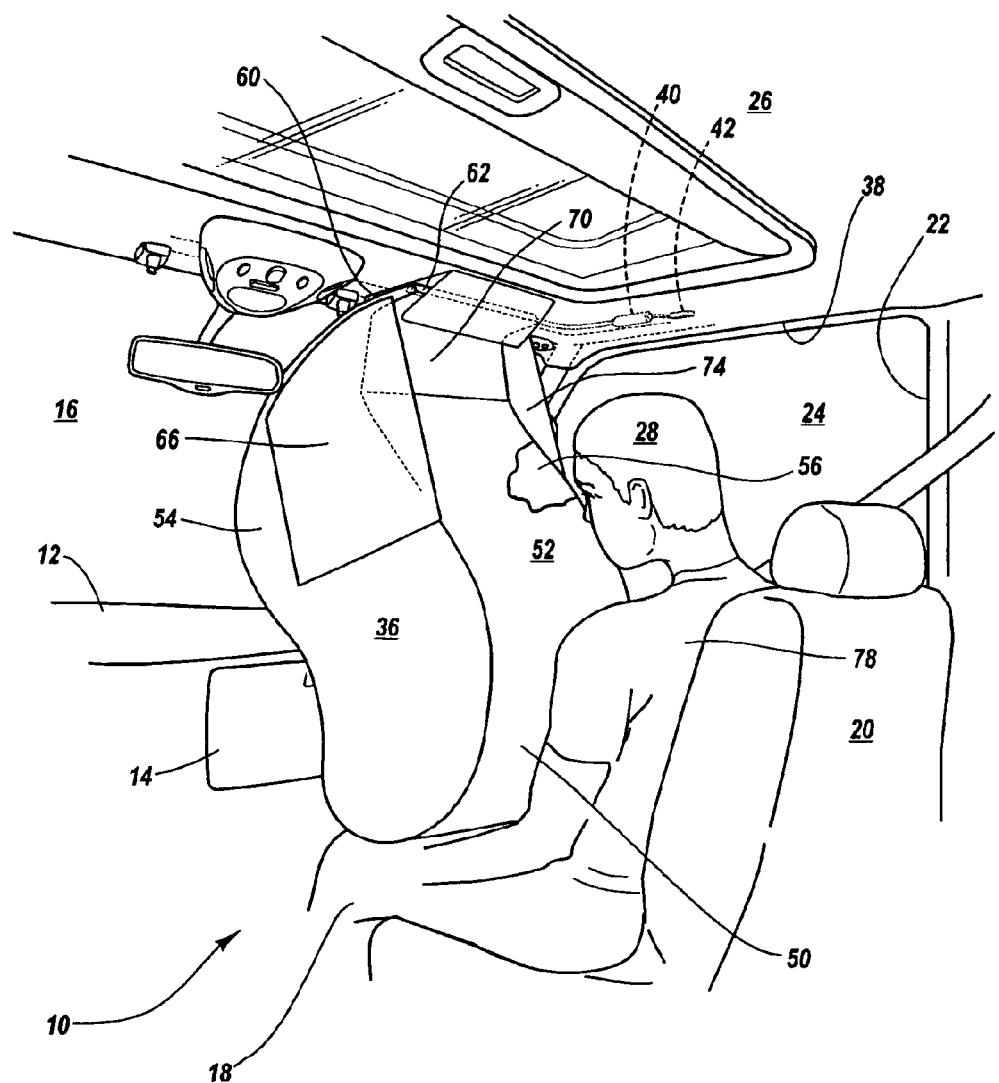
FIG. 1 is a partially cutaway perspective view of a vehicle interior in which an overhead airbag according to the present invention has been attached proximate to the vehicle's roof.

Referring first to FIG. 1, a partially cutaway perspective view of the front passenger side of a vehicle interior 10 is illustrated. The vehicle interior 10 includes a dashboard 12, a glove box 14, and a windshield 16 positioned in front a vehicle occupant 18 seated in passenger seat 20. The vehicle occupant 18 is encompassed in a lateral direction by a door 22 and a side window 24. A roof 26 is positioned above the head 28 of the vehicle occupant 18.

The vehicle interior 10 is further shown to include an overhead airbag 36 according to the present invention. The overhead airbag 36 is constructed of fabric material such as nylon and the like and is designed such that it may be mounted within the roof 26. The airbag 36 is designed such that in the event of an accident or crash, the airbag 36 will inflate and deploy into a position that prevents the vehicle occupant 18 from impacting a portion of the vehicle interior 10.

As the roof 26 and/or the overhead airbag 36 are often not visually appealing to customers, decorative trim 38 is usually added to increase the aesthetic attractiveness of the vehicle interior 10. The decorative trim 38 is usually made of vinyl, plastic, and the like and is designed to cover the roof 26 and the airbag 36. Preferably, the trim 38 is designed such that in the event of an accident or crash, the airbag 36 may deploy through the trim 38 into the vehicle interior 10.

The overhead airbag 36 may be in fluid communication with an inflator 40. More than one inflator 40 may also be used. The inflator 40 is a pyrotechnic or other device that is capable of deploying the airbag 36 into the inflated configuration during a crash by rapidly producing and/or channeling a volume of inflation gas into the airbag 36. An ECU 42 (represented graphically as a box) that detects a crash and/or provides a signal to the inflator 40 that initiates the inflation of the airbag 36 has also been illustrated.

The overhead airbag 36 includes a cushion portion 50. More than one cushion portion 50 may also be used. The cushion portion 50 is designed to receive the impact of the vehicle occupant 18 during a crash. More specifically, the cushion portion 50 is designed to receive the impact of the vehicle occupant 18 and prevent the occupant 18 from harmful impact with the windshield 16, the dashboard 12, the glove box 14, and/or other portions of the vehicle interior 10.

As can be seen in FIG. 1, embodiments of the airbag 36 may be constructed in which the cushion portion 50 comprises a front panel 52 that is attached to a first side panel 54. The front panel 52 is also attached to a second side panel 56 that is positioned opposite the first side panel 54. Preferably, the front panel 52 is attached to the side panels 54, 56 via sewing. Of course, other methods of attaching the front panel 52 to the side panels 54, 56 including welding, gluing, adhesive bonding, and the like, may also be used.

A throat 60 is also added to the overhead airbag 36. The throat 60 is positioned above the cushion portion 50 and is in fluid communication with the cushion portion 50. Preferably, the throat 60 is designed such that when the inflator 40 channels a volume of inflation gas into the airbag 36, the inflation gas accesses and inflates the cushion portion 50 by flowing through the throat 60.

The overhead airbag 36 may additionally include a mounting area 62 that is attached to the throat 60. The mounting area 62 is a portion or section of the airbag 36 that may be used to affix or attach the airbag 36 to the roof 26 and/or other sections of the vehicle interior 10. Preferably, the mounting area 62 is in fluid communication with the inflator 40 such that when the airbag 36 is inflated, the inflation gas enters the airbag 36 by passing through the mounting area 62.

Referring still to FIG. 1, the overhead airbag 36 further comprises a patch 66. More than one patch 66 may also be used. As with the other portions of the airbag 36, the patch 66 is made of a fabric material such as nylon and the like. The patch 66 is attached to the cushion portion 50. Such attachment is preferably accomplished by sewing a portion of the patch 66 to the cushion portion 50. However, other methods of attaching the patch 66 to the cushion portion 50 including adhesive bonding, welding, gluing, and the like, may also be used.

In the embodiment shown in FIG. 1, the patch 66 is further constructed such that when the airbag 36 is inflated, the airbag 36 retains a depression 70 between the cushion portion 50 and the throat 60. More specifically, the patch 66 is attached to the throat 60 and the first side panel 54 and is constructed such that when the airbag 36 is inflated, the airbag 36 retains the depression 70 between the front panel 52 and the throat 60.

A second patch 74 may additionally be added to the overhead airbag 36. More than one second patch 74 may also be used. The second patch 74 is positioned opposite the patch 66 and is attached to the throat 60 and the second side panel 56. As with the patch 66, the second patch 74 is constructed such that when the airbag 36 is inflated, the airbag 36 retains the depression 70 between the front panel 52 and the throat 60.

In the embodiment shown in FIG. 1, the airbag 36 may be further configured such that the depression 70 is sized to receive the head 28 and/or torso 78 of the occupant 18. As a result, in the event a crash occurs and the occupants' head 28 and/or torso 78 impacts the cushion portion 50, the head 28 and torso 78 will not slide or deflect off the front panel 52. Rather, the depression 70 will receive the impact of the head 28 and/or the torso 78 and allow the cushion portion 50 to restrain the movement of the vehicle occupant 18.

Figure 2:
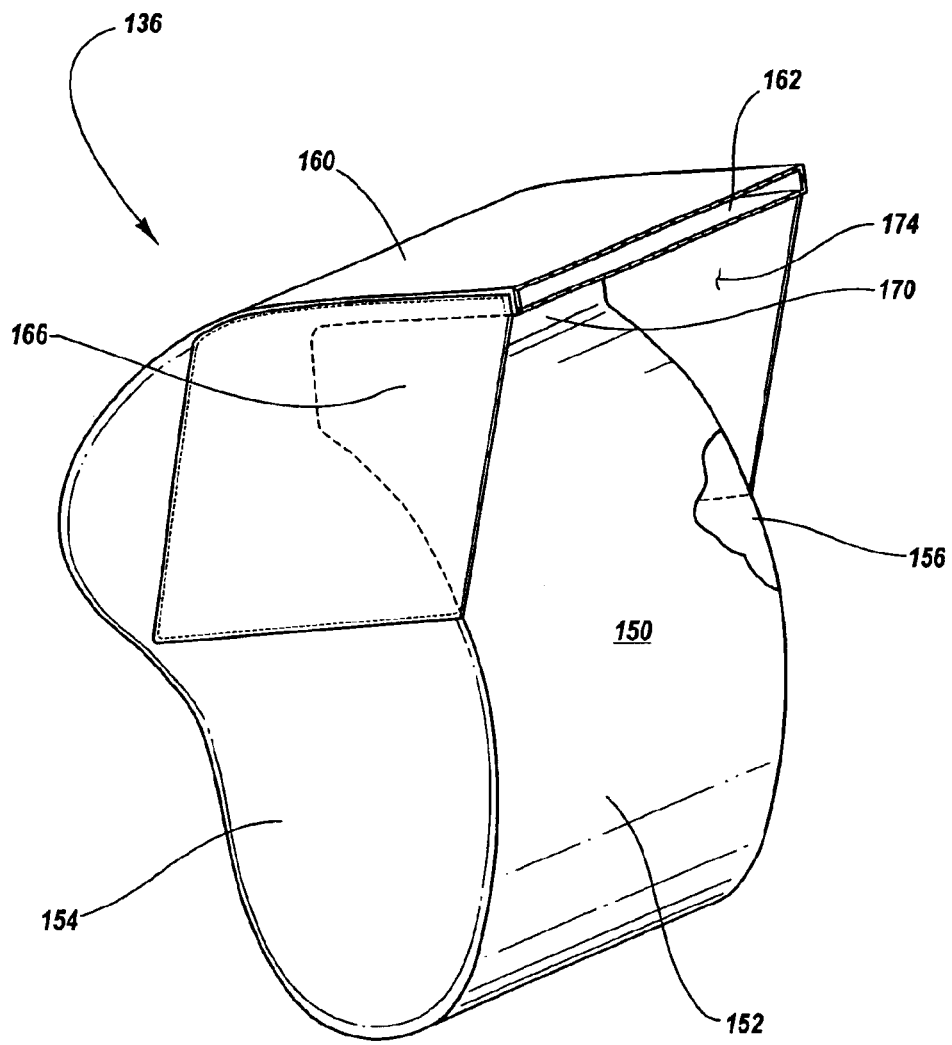
FIG. 2 is a partially cutaway perspective view of a further embodiment of the overhead airbag of the present invention.

Referring now to FIG. 2, a further embodiment of the present invention is illustrated. More specifically, FIG. 2 is a partially cutaway perspective view of an overhead airbag 136 that may be mounted onto the vehicle interior 10 (shown in FIG. 1). As can be seen in FIG. 2, most of the components and elements of the overhead airbag 136 and the vehicle interior are similar and/or equivalent to the components and elements that are found in the embodiment described above.

As with the previous embodiment, the overhead airbag 136 includes a cushion portion 150. More than one cushion portion 150 may also be used. The cushion portion 150 is designed to receive the impact of the vehicle occupant 18 (shown in FIG. 1) during a crash. More specifically, the cushion portion 150 is designed to receive the impact of the vehicle occupant 18 and prevent the occupant 18 from harmful impact with a portion of the vehicle interior 10.

The cushion portion 150 may comprise a front panel 152 that is attached to a first side panel 154. The front panel 152 is also attached to a second side panel 156 that is positioned opposite the first side panel 154. As with the previous embodiment, the front panel 152 is attached to the side panels 154, 156 via sewing welding, gluing, adhesive bonding, or other similar methods.

A throat 160 is also added to the overhead airbag 136. The throat 160 is positioned above the cushion portion 150 and is in fluid communication with the cushion portion 150. Preferably, the throat 160 is designed such that when the inflator 40 (shown in FIG. 1) channels the inflation gas into the airbag 136, the inflation gas will access the cushion portion 150 by passing or flowing through the throat 160.

The overhead airbag 136 may additionally include a mounting area 162 that is attached to the throat 160. The mounting area 162 is a portion or section of the airbag 136 that may be used to affix or attach the airbag 136 to the vehicle interior 10. Preferably, the mounting area 162 is in fluid communication with the inflator 40 such that when the airbag 136 is inflated, the inflation gas enters the airbag 136 by passing through the mounting area 162.

Referring still to FIG. 2, the overhead airbag 136 further comprises a patch 166. More than one patch 166 may also be used. As with the other portions of the airbag 136, the patch 166 is made of a fabric material such as nylon and the like and is attached to the cushion portion 150 via sewing, adhesive bonding, welding, and other similar methods.

Like the embodiment shown in FIG. 1, the patch 166 is constructed such that when the airbag 136 is inflated, the airbag 136 retains a depression 170 between the cushion portion 150 and the throat 160. More specifically, the patch 166 is attached to the throat 160 and the first side panel 154 and is constructed such that when the airbag 136 is inflated, the airbag 136 retains the depression 170 between the front panel 152 and the throat 160.

A second patch 174 may additionally be added to the overhead airbag 136. More than one second patch 174 may also be used. The second patch 174 is positioned opposite the patch 166 and is attached to the throat 160 and the second side panel 156. As with the patch 166, the second patch 174 is constructed such that when the airbag 136 is inflated, the airbag 136 retains the depression 170 between the front panel 152 and the throat 160.

As with the previous embodiment, the overhead airbag 136 may be further configured such that the depression 170 is sized to receive the occupant's head 28 (shown in FIG. 1) and/or torso 78 (shown in FIG. 1). Thus, in the event of an accident or crash, the head 28 and torso 78 will not slide or deflect off the front panel 152; rather, the depression 170 will receive the impact of the head 28 and/or the torso 78 and allow the cushion portion 150 to protect and restrain the occupant.

However, unlike the embodiment shown in FIG. 1, the airbag 136 has been constructed such that the patches 166, 174 contact the mounting area 162. Of course, those of skill in the art will recognize that other embodiments may also be made in which the shape, configuration, and/or orientation of one or more of the patches 166, 174 differs from that which is shown in FIG. 2. For example, some embodiments may be made in which the patch 166 wraps around all or a portion of the throat 160. Further embodiment may be made in which the patch 166 contacts a portion of the second side panel 156. Additional embodiments may be constructed in which the patch 166 covers the entirety of the first side panel 154. Yet further embodiments may be constructed in which the second patch 174 covers the entirety of the second side panel 156.

Figure 3:
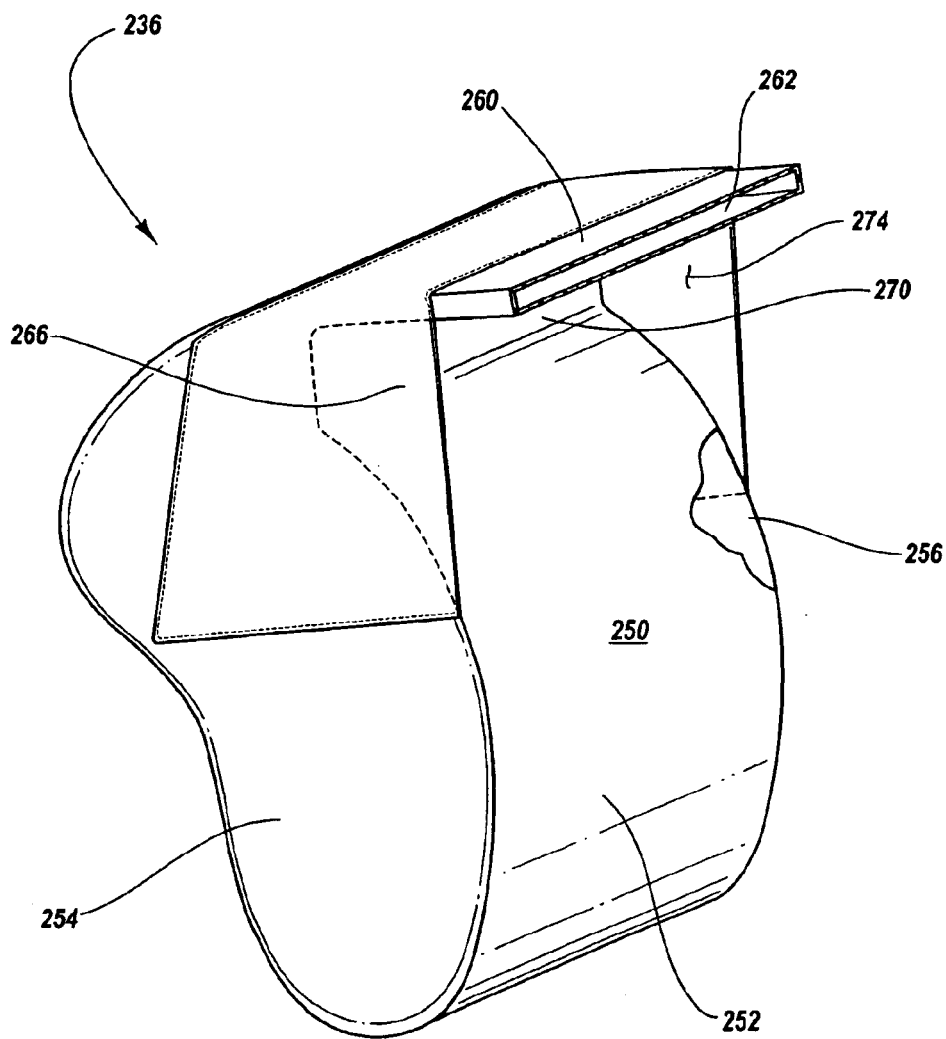
FIG. 3 is a partially cutaway perspective view of an additional embodiment of the overhead airbag of the present invention.

Referring now to FIG. 3, an additional embodiment of the present invention is illustrated. FIG. 3 is a partially cutaway perspective view of an overhead airbag 236 that may be mounted onto the vehicle interior 10 (shown in FIG. 1). As can be seen in FIG. 3, most of the components and elements of the overhead airbag 236 are similar and/or equivalent to the components and elements that are found in the embodiments described above.

As with the previous embodiments, the overhead airbag 236 includes a cushion portion 250. More than one cushion portion 250 may also be used. The cushion portion 250 is designed to receive the impact of the vehicle occupant 18 (shown in FIG. 1). More specifically, the cushion portion 250 is designed to receive the impact of the vehicle occupant 18 and prevent the occupant 18 from harmful impact with a portion of the vehicle interior 10.

The cushion portion 250 may comprise a front panel 252 that is attached to a first side panel 254. The front panel 252 is also attached to a second side panel 256 that is positioned opposite the first side panel 254. As with the previous embodiments, the front panel 252 is attached to the side panels 254, 256 via sewing welding, gluing, adhesive bonding, or other similar methods.

A throat 260 is also added to the overhead airbag 236. The throat 260 is positioned above the cushion portion 250 and is in fluid communication with the cushion portion 250. Preferably, the throat 260 is designed such that when the inflator 40 (shown in FIG. 1) channels a volume of inflation gas into the airbag 236, the inflation gas accesses and inflates the cushion portion 250 by flowing through the throat 260.

The overhead airbag 236 may additionally include a mounting area 262 that is attached to the throat 260. The mounting area 262 is a portion or section of the airbag 236 that may be used to affix or attach the airbag 236 to the roof 226 and/or other sections of the vehicle interior 210. Preferably, the mounting area 262 is in fluid communication with the inflator 40 such that when the airbag 236 is inflated, the inflation gas enters the airbag 236 by passing through the mounting area 262.

Referring still to FIG. 3, the overhead airbag 236 further comprises a patch 266. More than one patch 266 may also be used. As with the other portions of the airbag 236, the patch 266 is made of a fabric material such as nylon and the like and is attached to the cushion portion 250 via sewing, adhesive bonding, welding, and other similar methods.

Like the embodiments described above, the patch 266 is constructed such that when the airbag 236 is inflated, the airbag 236 retains a depression 270 between the cushion portion 250 and the throat 260. More specifically, the patch 266 is attached to the throat 260 and the first side panel 254 and is constructed such that when the airbag 236 is inflated, the airbag 236 retains the depression 270 between the front panel 252 and the throat 260.

However, unlike the embodiments described above, the airbag 236 does not comprise a second patch. Rather, the airbag 236 is constructed such that the patch 266 wraps around the throat 260. More specifically, the airbag 236 is constructed such that the patch 266 wraps around the throat 260 and is attached (via sewing, adhesive bonding, gluing, welding, and the like) to the second side panel 256.

The overhead airbag 236 may be further configured such that the depression 270 is sized to receive the occupant's head 28 (shown in FIG. 1) and/or torso 78 (shown in FIG. 1). Thus, in the event of an accident or crash, the head 28 and torso 78 will not slide or deflect off the front panel 252; rather, the depression 270 will receive the impact of the head 28 and/or the torso 78 and allow the cushion portion 250 to protect and restrain the occupant.

Figure 4:
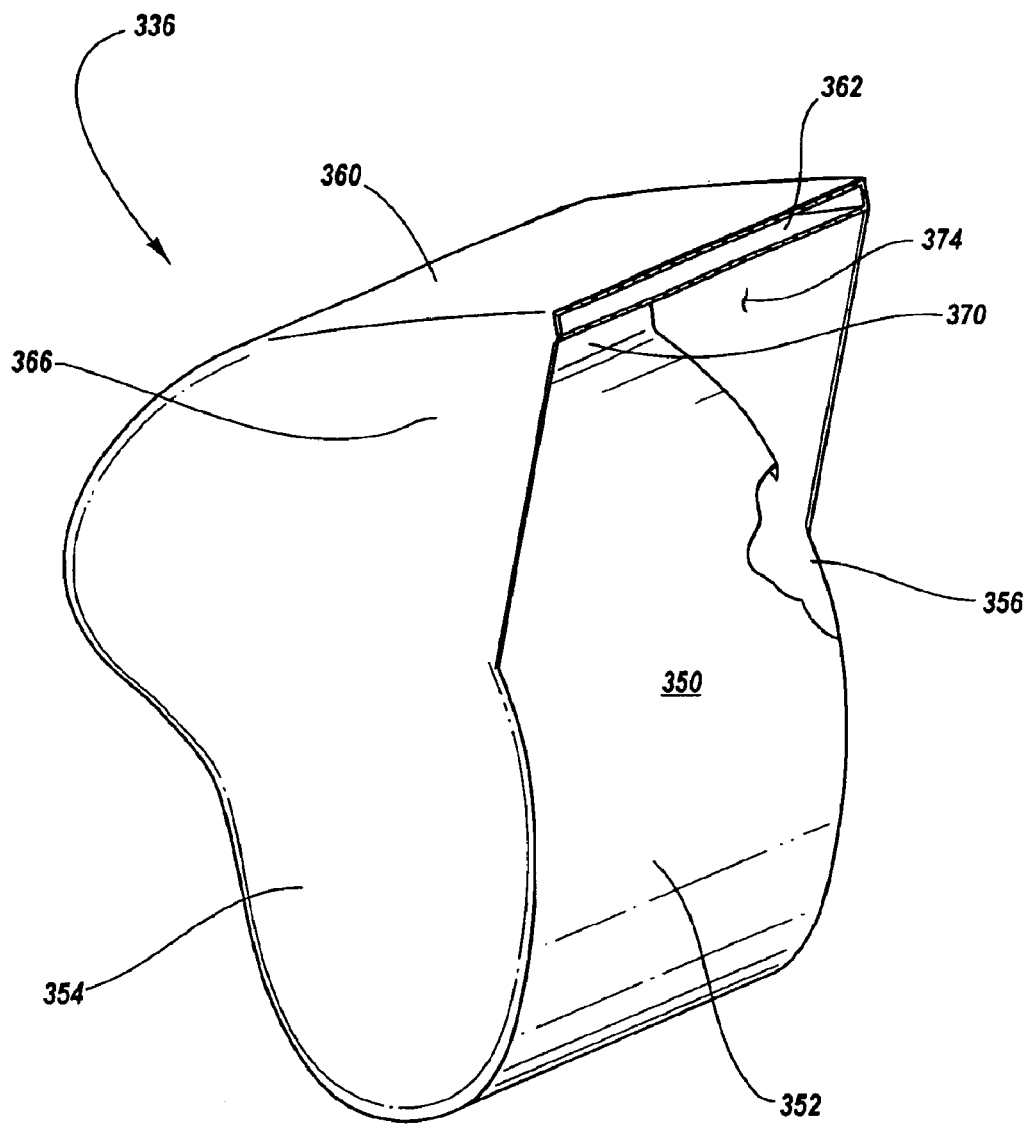
FIG. 4 is a partially cutaway perspective view of yet a further embodiment of the overhead airbag of the present invention.

Referring now to FIG. 4, a yet further embodiment of the present invention is illustrated. FIG. 4 is a partially cutaway perspective view of an overhead airbag 336 that may be mounted onto a vehicle interior 10 (shown in FIG. 1). As can be seen in FIG. 4, most of the components and elements of the overhead airbag 336 are similar and/or equivalent to the components and elements that are found in the embodiments described above.

As with the previous embodiments, the overhead airbag 336 includes a cushion portion 350. More than one cushion portion 350 may also be used. The cushion portion 350 is designed to receive the impact of the vehicle occupant 318 during a crash. More specifically, the cushion portion 350 is designed to receive the impact of the vehicle occupant 318 and prevent the occupant 318 from harmful impact with a portion of the vehicle interior 10.

The cushion portion 350 may comprise a front panel 352 that is attached to a first side panel 354. The front panel 352 is also attached to a second side panel 356 that is positioned opposite the first side panel 354. As with the previous embodiments, the front panel 352 is attached to the side panels 354, 356 via sewing welding, gluing, adhesive bonding, or other similar methods.

A throat 360 is also added to the overhead airbag 336. The throat 360 is positioned above the cushion portion 350 and is in fluid communication with the cushion portion 350. Preferably, the throat 360 is designed such that when the inflator 40 (shown in FIG. 1) channels a volume of inflation gas into the airbag 336, the inflation gas accesses and inflates the cushion portion 350 by flowing through the throat 360.

The overhead airbag 336 may additionally include a mounting area 362 that is attached to the throat 360. The mounting area 362 is a portion or section of the airbag 336 that may be used to affix or attach the airbag 336 to the roof 326 and/or other sections of the vehicle interior 310. Preferably, the mounting area 362 is in fluid communication with the inflator 40 such that when the airbag 336 is inflated, the inflation gas enters the airbag 336 by passing through the mounting area 362.

Referring still to FIG. 4, the overhead airbag 336 further comprises a patch 366. More than one patch 366 may also be used. As with the other portions of the airbag 336, the patch 366 is made of a fabric material such as nylon and the like and is attached to the cushion portion 350 via sewing, adhesive bonding, welding, and other similar methods. However, unlike the embodiments described above, the airbag 336 is constructed such that the patch 366 is integral with the first side panel 354. "Integral with the first side panel" means that the patch 366 has been formed, patterned, constructed, included, or otherwise added such that the patch 366 comprises a portion or section of the first side panel 354.

The patch 366 is constructed such that when the airbag 336 is inflated, the airbag 336 retains a depression 370 between the cushion portion 350 and the throat 360. More specifically, the patch 366 is attached to the throat 360 and the first side panel 354 and is constructed such that when the airbag 336 is inflated, the airbag 336 retains the depression 370 between the front panel 352 and the throat 360.

A second patch 374 may additionally be added to the overhead airbag 336. More than one second patch 374 may also be used. The second patch 374 is positioned opposite the patch 366 and is attached to the throat 360 and the second side panel 356. As with the patch 366, the second patch 374 is constructed such that when the airbag 336 is inflated, the airbag 336 retains the depression 370 between the front panel 352 and the throat 360. Additionally, the airbag 336 may be further constructed such that the second patch 374 is integral with the second panel 356. "Integral with the second panel" means that the second patch 374 has been formed, patterned, constructed, included, or otherwise added such that the second patch 374 comprises a portion or section of the second side panel 356.

The overhead airbag 336 may be further configured such that the depression 370 is sized to receive the occupant's head 28 (shown in FIG. 1) and/or torso 78 (shown in FIG. 1). Thus, in the event of an accident or crash, the head 28 and torso 78 will not slide or deflect off the front panel 352; rather, the depression 370 will receive the impact of the head 28 and/or the torso 78 and allow the cushion portion 350 to protect and restrain the occupant.

In summary, the present invention provides a novel overhead airbag that includes a patch that is designed to ensure that the airbag's cushion portion achieves and maintains the proper position during a crash. As a result, many of the problems and limitations associated with previously known overhead airbag systems have been effectively eliminated.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

I claim:

1. An overhead airbag comprising:
   a cushion portion, wherein the cushion portion comprises a front panel, a first side panel, and a second side panel;
   a throat positioned above the cushion portion; and
   at least one patch attached to the cushion portion, the patch constructed such that when the airbag is in the inflated configuration, the airbag retains a depression between the cushion portion and the throat, wherein the patch is attached to the throat and the first side panel.

2. An overhead airbag as in claim 1 wherein the patch is attached to the cushion portion and the throat via sewing.

3. An overhead airbag as in claim 1 wherein the patch is attached to the cushion portion and the throat via adhesive bonding.

4. An overhead airbag as in claim 1 wherein the airbag is designed to receive the impact of a vehicle occupant during a crash.

5. An overhead airbag as in claim 1 wherein the depression is designed to receive the vehicle occupants' head during a crash.

6. An overhead airbag as in claim 1 wherein the airbag further comprises a mounting area.

7. An overhead airbag as in claim 6 wherein the mounting area is attached to the throat.

8. An overhead airbag as in claim 6 wherein the mounting area is in fluid communication with an inflator.

9. An overhead airbag as in claim 6 wherein the patch contacts the mounting area.

10. An overhead airbag as in claim 1 wherein the patch wraps around the throat.

11. An overhead airbag as in claim 1 wherein the patch is integral with the first side panel.

12. An overhead airbag as in claim 1 wherein a second patch is attached to the second side panel.

13. An overhead airbag comprising:
    a cushion portion having a front panel and a first side panel;
    a throat positioned above the cushion portion; and
    at least one patch attached to the cushion portion, the patch constructed such that when the airbag is in the inflated configuration, the airbag retains a depression between the front panel and the throat, wherein the patch is attached to the first side panel and the throat.

14. An overhead airbag as in claim 13 wherein the patch is attached to the cushion portion and the throat via sewing.

15. An overhead airbag as in claim 13 wherein the patch is attached to the cushion portion and the throat via adhesive bonding.

16. An overhead airbag as in claim 13 wherein the airbag is designed to receive the impact of a vehicle occupant during a crash.

17. An overhead airbag as in claim 13 wherein the depression is designed to receive the vehicle occupants' head during a crash.

18. An overhead airbag as in claim 13 wherein the airbag further comprises a mounting area.

19. An overhead airbag as in claim 18 wherein the mounting area is attached to the throat.

20. An overhead airbag as in claim 18 wherein the mounting area is in fluid communication with an inflator.

21. An overhead airbag as in claim 18 wherein the patch contacts the mounting area.

22. An overhead airbag as in claim 18 wherein the patch wraps around the throat.

23. An overhead airbag as in claim 13 wherein the patch is integral with the first side panel.

24. An overhead airbag as in claim 13 wherein the cushion portion further comprises a second side panel.

25. An overhead airbag as in claim 24 wherein a second patch is attached to the second side panel.

26. An overhead airbag as in claim 24 wherein the patch is attached to the first side panel and the second side panel.

27. An overhead airbag comprising:
    a cushion portion having a front panel and a first side panel;
    a throat positioned above the cushion portion;
    a mounting area ie attached to the throat; and
    at least one patch attached to the first side panel and the throat, the patch constructed such that when the airbag is in the inflated configuration, the airbag retains a depression between the front panel and the throat.

28. An overhead airbag as in claim 27 wherein the patch in integral with the first side panel.

29. An overhead airbag as in claim 27 wherein the patch wraps around the throat.

30. An overhead airbag in claim 27 wherein the patch contacts the mounting area.

31. An overhead airbag as in claim 27 wherein the patch is attached to the first side panel via sewing.

32. An overhead airbag as in claim 27 wherein the cushion portion further comprises a second side panel.

33. An overhead airbag as in claim 32 wherein a second patch is attached to the second side panel.

34. An overhead airbag as in claim 32 wherein the patch is attached to the first side panel and the second side panel.

* * * * *